(12) United States Patent
Bischoff et al.

(10) Patent No.: US 6,554,011 B1
(45) Date of Patent: Apr. 29, 2003

(54) DEVICE FOR CLEANING GERMINATION TRAYS

(75) Inventors: Wolf-Eckart Bischoff, Salzgitter (DE); Walter Faist, Vechelde (DE)

(73) Assignee: Bühler AG, Uzwil (CH)

( * ) Notice: Subject to any disclaimer, the term of this patent is extended or adjusted under 35 U.S.C. 154(b) by 170 days.

(21) Appl. No.: 09/579,500

(22) Filed: May 30, 2000

(30) Foreign Application Priority Data

May 28, 1999 (DE) .......................................... 199 24 528

(51) Int. Cl.⁷ .............................. B08B 3/02; B05B 3/12
(52) U.S. Cl. .................. 134/172; 435/291.1; 239/160; 239/165
(58) Field of Search .............................. 134/144, 167 R, 134/172; 239/160, 165; 435/291.1, 291.2

(56) References Cited

U.S. PATENT DOCUMENTS

| | | | |
|---|---|---|---|
| 4,029,116 A | 6/1977 | Beyer | 134/167 R |
| 4,220,170 A * | 9/1980 | Hebert et al. | 134/167 R |
| 4,698,309 A | 10/1987 | Andreasen | 435/302 |
| 4,734,374 A | 3/1988 | Andreasen | 435/302 |
| 4,767,715 A | 8/1988 | Andreasen | 435/302 |
| 4,783,414 A | 11/1988 | Andreasen | 435/302 |
| 4,886,759 A | 12/1989 | Andreasen | 435/310 |
| 4,921,806 A | 5/1990 | Andreasen | 435/302 |
| 4,943,534 A | 7/1990 | Andreasen | 435/302 |
| 5,657,781 A | 8/1997 | Steverson | 134/144 |

FOREIGN PATENT DOCUMENTS

| | | |
|---|---|---|
| CZ | 97231 | 4/1960 |
| DE | 1417572 | 10/1968 |
| DE | 1442114 | 11/1969 |
| DE | 7437732 | 6/1975 |
| DE | 2654758 | 6/1978 |
| DE | 2801715 | 7/1979 |
| DE | 3305260 | 8/1984 |

* cited by examiner

Primary Examiner—Randy Gulakowski
Assistant Examiner—Joseph Perrin
(74) Attorney, Agent, or Firm—Greenblum & Bernstein, P.L.C.

(57) ABSTRACT

Method and device for cleaning germination trays. The device includes a moveable carriage comprising at least one telescoping carrier, the at least one telescoping carrier being coupled to at least one supply line, and a cleaning unit coupled to the at least one telescoping carrier. The method includes extending the at least one telescoping carrier from the moveable carriage, moving the moveable carriage, and directing a cleaning fluid onto a portion of the germinating tray using the at least one cleaning unit, wherein the cleaning fluid cleans the portion of the germination tray.

22 Claims, 4 Drawing Sheets

DEVICE FOR CLEANING GERMINATION TRAYS

CROSS-REFERENCE TO RELATED APPLICATIONS

The present application claims priority under 35 U.S.C. §119 of German Patent Application No. 199 24 528.2, filed on May 28, 1999, the disclosure of which is expressly incorporated by reference herein in its entirety.

BACKGROUND OF THE INVENTION

1. Field of the Invention

This invention concerns a method and a device for cleaning germination trays, in particular for automatic cleaning of germination trays in a malt house with a cleaning carriage.

2. Discussion of Background Information

German Patent No. 2,801,715 C and Unexamined German Patent No. 2,654,758 describe the loading of drying kiln trays in malt houses or application of granular bulk material to germination trays or drying trays. CS Patent No. 97,231 describes the application of green malt to the trays of a malt drying kiln by way of rotating, telescoping discharge tubes. However, the latter are in a fixed mount in the ceiling area and can reach only a portion of the tray.

Unexamined German Patent No. 1,417,572 also describes devices for clearing germination boxes having a carriage that can travel along the germination box for batch-wise clearing of germination material. Work cycles between clearing and emptying are kept constant by a timer.

With another device for clearing germination boxes according to Unexamined German Patent No. 1,442,114, the advance motion of a reversing carriage is utilized. The device utilizes reversing elements designed as reversing worm gears travel into the germination material while rotating are retracted toward a conveyor device mounted on the edge of the germination box, thereby entraining material while the reversing worm gears remain stationary. No residues of the germination material should remain on the bottom of the germination box. The reversing worm gears have entraining devices on their lower end for this purpose. Moreover, hydraulically raised and lowered reversing carriages with triangular bucket conveyors are also known.

Conventionally, germination trays are cleaned either manually with highpressure sprays, utilizing a water hose or the like or with cleaning carriages that can travel in a ring or a line. Such a system is disclosed in U.S. Pat. No. 4,029,116 to BEYER, the disclosure of which is expressly incorporated by reference in its entirety.

In most cases, multiple cleaning carriages are necessary, and water and power are supplied over a relatively great distance. As a result, the assembly and maintenance costs of such cleaning carriages are high.

SUMMARY OF THE INVENTION

The invention avoids the disadvantages of the state of the art and simplifies the operation of the cleaning carriages while reducing the number of such carriages required per germination tray.

The telescoping cleaning carriage according to this invention makes it possible to use only a single cleaning carriage per germination tray. The cost of supplying utilities (water, power) is accordingly reduced, while flexibility and the cleaning effect are greatly increased. Moreover, in the resting position (retracted position), very little space required is required. Additionally, the control complexity is also low, and this system can be used for both angular and round trays.

The invention therefore provides a device for cleaning germination trays having a traversing carriage with a carrier to accommodate supply lines for power and water and cleaning units, characterized in that the device contains telescoping carriers on which a supply line is arranged, with a cleaning unit being arranged on the outer telescoping carrier. The telescoping carrier may be mounted so it can be rotated and/or pivoted and/or displaced longitudinally on a side wall of the germination tray. Moreover, the cleaning units may include nozzles and/or nozzle strips. Additional nozzle strips or nozzles may also be utilized on the telescoping carrier. Further, the cleaning unit can be arranged so it can rotate.

According to one aspect of the invention, there is provided a device for cleaning germination trays comprising a moveable carriage comprising at least one telescoping carrier, the at least one telescoping carrier being coupled to at least one supply line, and a cleaning unit coupled to the at least one telescoping carrier. The moveable carriage may be moveable in a direction transverse to a telescoping direction of the at least one telescoping carrier. The device may further comprise a power unit coupled to the at least one telescoping carrier, a water unit coupled to the telescoping carrier, wherein supply lines are coupled to the water unit and the power unit. The at least one carrier may comprise a plurality of telescoping carriers. The plurality of telescoping carriers may be telescopically mounted together.

The device may direct a cleaning fluid to a portion of the germination tray, the cleaning fluid comprising water. The cleaning fluid may comprise water and at least one additive. The device may be positioned in the germinating tray such that the moveable carriage is moveable parallel to a side wall of germinating tray. The at least one telescoping carrier may be rotatable relative to a side wall of the germination tray. The at least one telescoping carrier may be pivotal relative to a side wall of the germination tray. The at least one cleaning unit may comprise at least one of at least one nozzle and at least one nozzle strip.

The device may further comprise at least one additional cleaning unit coupled to the at least one telescoping carrier. The at least one additional cleaning unit may be directed to clean at least one of a bottom of the germination tray and a side of the germination tray. The at least one additional cleaning unit may comprise one of at least one nozzle and at least one nozzle strip. The at least one cleaning unit may be mounted on an outermost part of the at least one telescoping carrier. The device may further comprise a controller for controlling the movement of the moveable carriage. The controller may control a telescopic movement of the at least one telescoping carrier. The device may further comprise a control program for controlling the movements of one of the moveable carriage and the at least one telescoping carrier.

The moveable carriage may be mounted to a side wall via at least one guide roll which is supported on at least one guide. The moveable carriage may comprise a control motor for moving the moveable carriage. The moveable carriage may be fed with cleaning fluid and power from a connection disposed on at least one side wall of the germination tray.

The invention also provides for a device for cleaning germination trays comprising a moveable carriage comprising a plurality of telescoping carriers, at least one of the plurality of carriers having at least one cleaning unit and accommodating at least one supply line which carries a cleaning fluid, wherein each of the plurality of carriers is telescopically moveable with respect to the moveable carriage.

The invention further provides for a method of cleaning germination trays in a device comprising a moveable carriage comprising at least one telescoping carrier, the at least one telescoping carrier being coupled to at least one supply line, and a cleaning unit coupled to the at least one telescoping carrier, the method comprising extending the at least one telescoping carrier from the moveable carriage, moving the moveable carriage, and directing a cleaning fluid onto a portion of the germinating tray using the at least one cleaning unit, wherein the cleaning fluid cleans the portion of the germination tray. The method may further comprise retracting the at least one telescoping carrier into the moveable carriage. The moving may comprise moving the carriage in a direction transverse to a telescoping direction of the at least one telescoping carrier. The method may further comprise initiating a control program which controls the movements of one of the moveable carriage and the at least one telescoping carrier. The moving may comprise moving the carriage in one of a curved path and a circular path.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
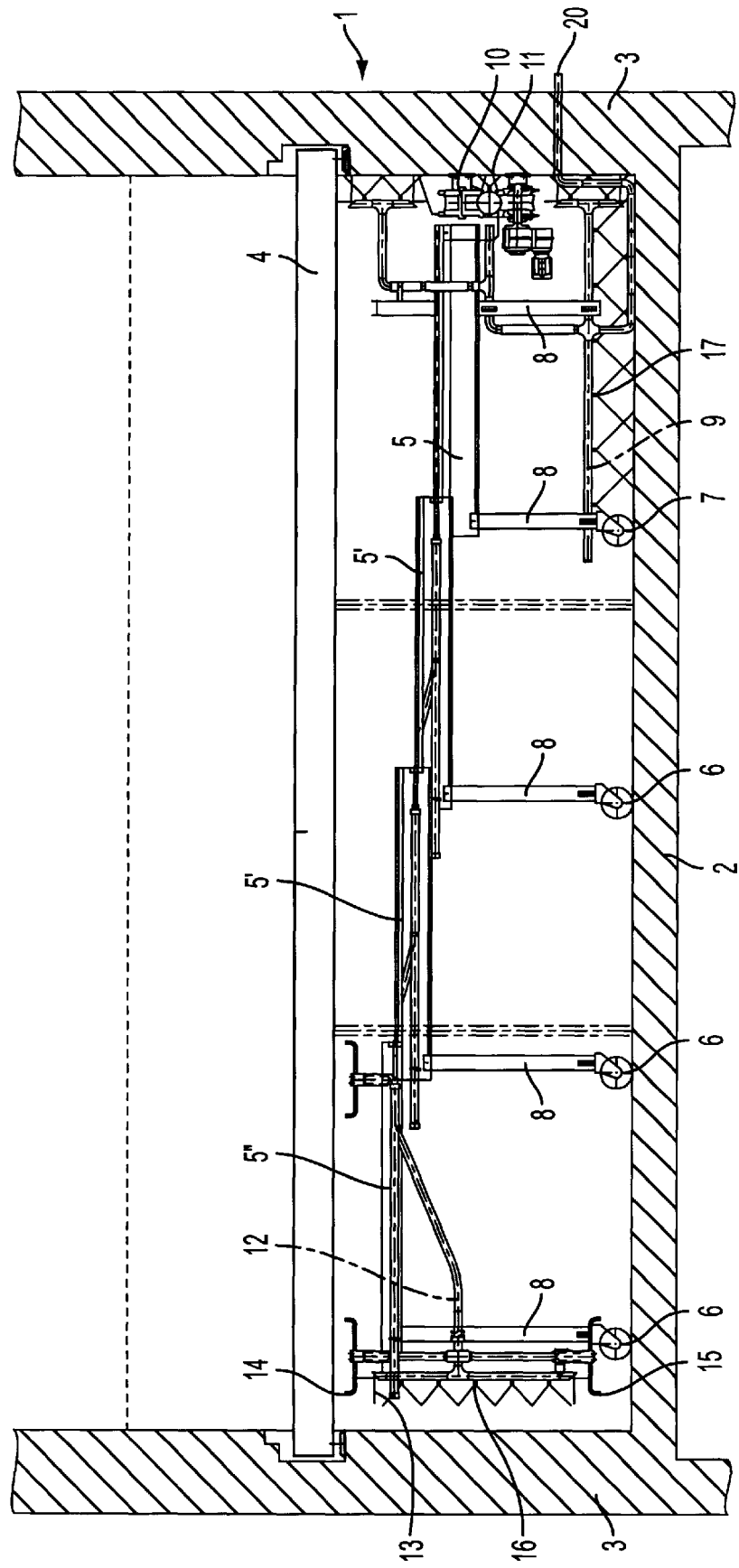
FIG. 1 is a sectional view of a telescoping apparatus in a germination tray (extended position)
Figure 3:
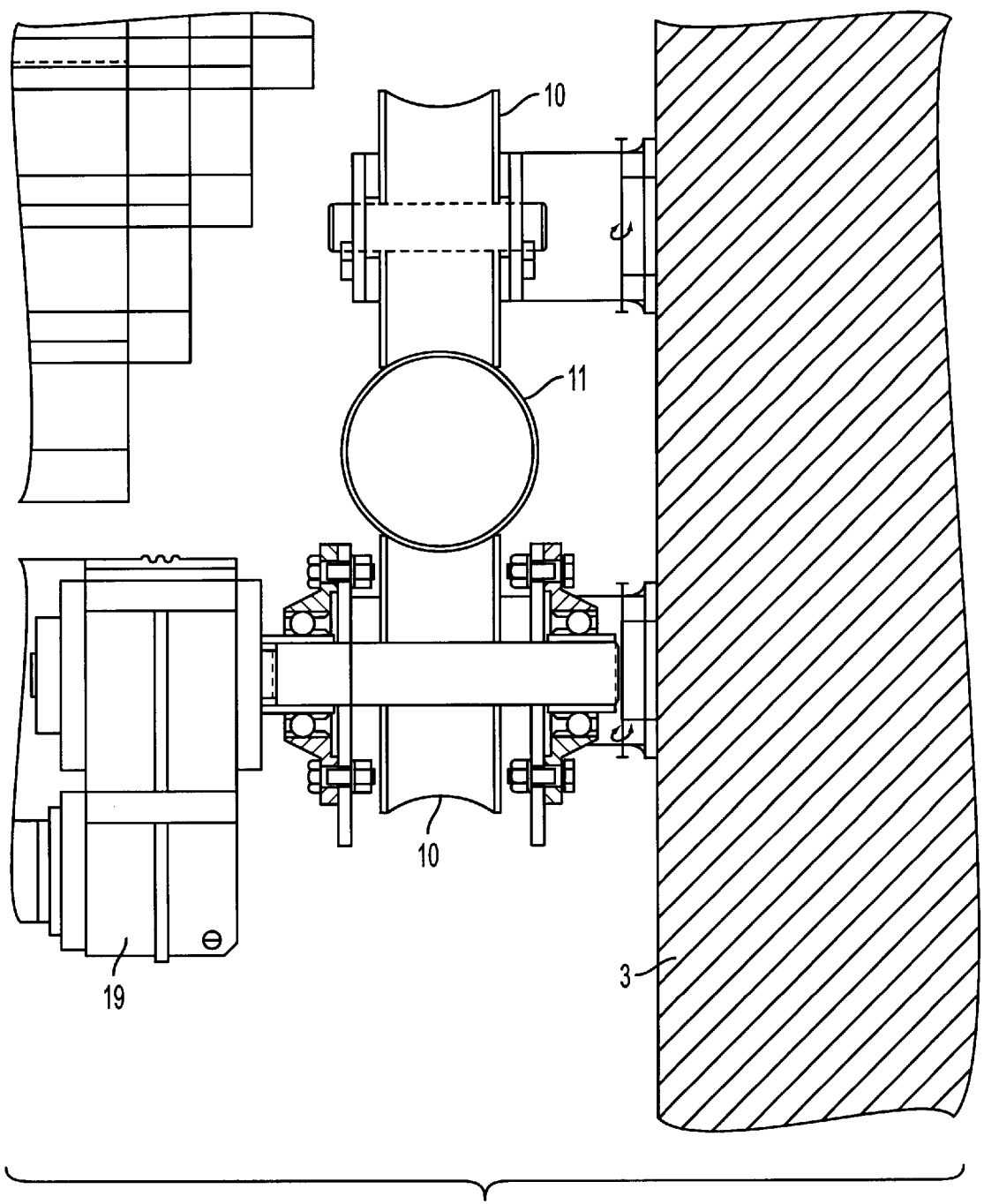
FIG. 3 is a detailed partial view of FIG. 1 showing the guide roll and guide profile)

A germination tray (or tank) 1 has a bottom 2 of concrete and side walls 3 as well as a displaceable perforated sheet tray bottom 4. In order to clear off tray bottom 4, side walls 3 and bottom 2 (the surface or the filling level of the germination material is shown with a dotted line in FIG. 1 as an example), a movable carriage or telescoping apparatus is arranged between two side walls 3. This device has several telescoping carriers 5, 5', 5" which can be moved by way of linear guides and carrying rollers 6, 7. Rollers 7 as well as telescoping carriers 5, 5', 5" are guided on an inner guide device 10, 11 over supports 8. Inner guide device 10, 11 is mounted on side wall 3 (see FIG. 3) and includes a guide profile 11 and guide rolls 10.

Telescoping carriers 5, 5', 5" are interconnected using conventional linear 20 guides which utilize telescoping. The telescoping motion is accomplished, e.g., by one pneumatic cylinder per telescope. However, other telescoping mechanisms are also contemplated by the invention.

A controller and/or a motor 19, as well as, the power, and water supply 20 are arranged beneath inner guide device 10, 11. Additionally, power and water are fed from a supply unit 20 over supply lines 12 to a cleaning unit 13. The cleaning carriage device utilizes flexible supply lines (not shown) which connect it to side wall 3. Moreover, these flexible lines are preferably guided and may include mechanisms for rolling them up so that they are safely stored out of the way when the carriage is retracted (not shown).

Cleaning unit 13 includes nozzles 14, 15 for cleaning the top and bottom of the trays and a nozzle strip 16 for cleaning side wall 3.

Figure 2:
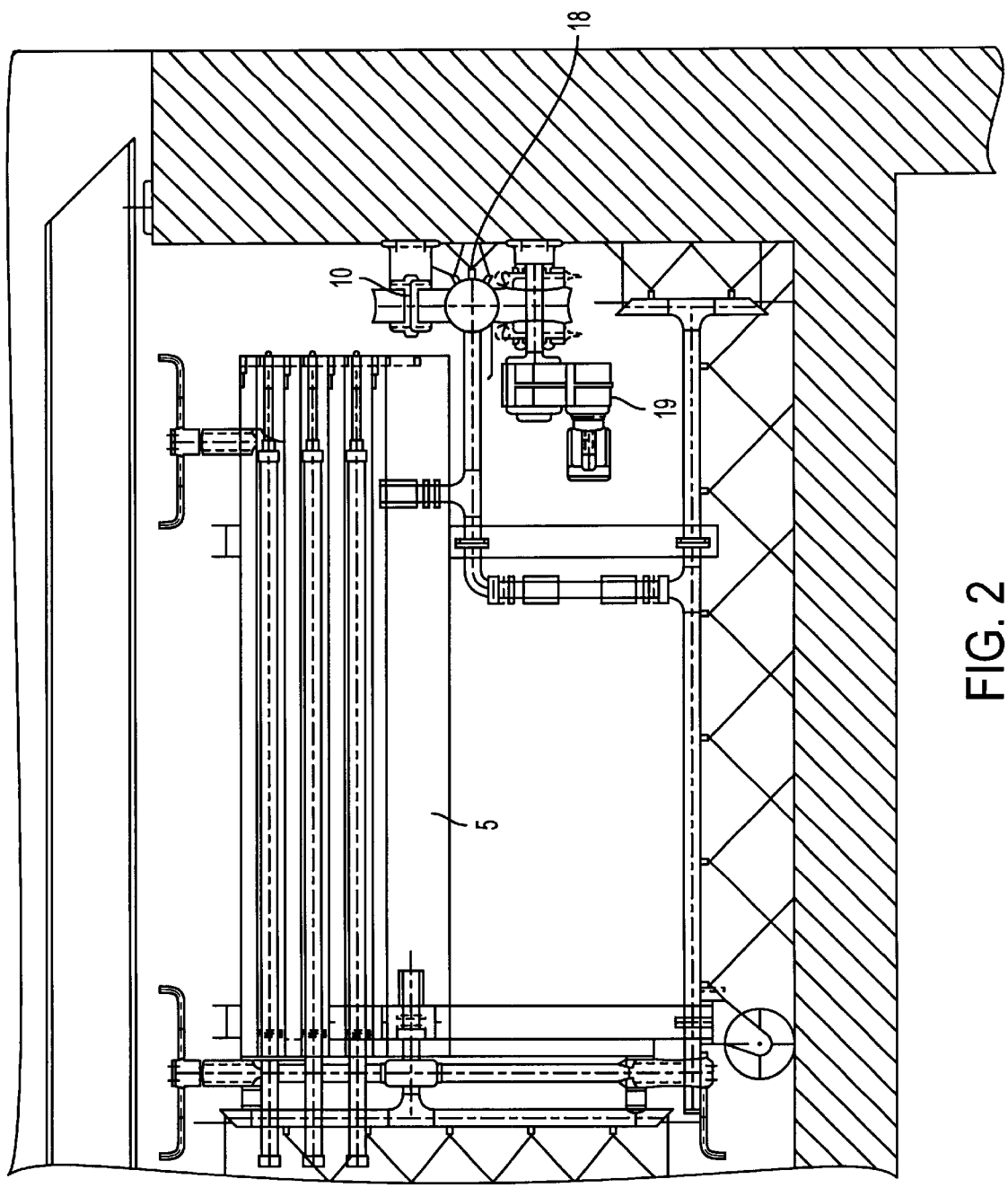
FIG. 2 is a detailed partial view of FIG. 1 (in the retracted position)

Another nozzle strip 17 is also utilized for cleaning bottom 2 and parts of the side wall 3 are supplied with power by a power supply unit. This nozzle strip 17 is arranged on a guide rail 9. Additional nozzles 18 (see FIG. 2) for cleaning the side wall are also provided. Cleaning unit 13 may also be arranged so it can rotate, e.g., in a manner which is similar to that described in U.S. Pat. No. 4,029,116.

The cleaning agent is preferably water, which is provided with suitable additives as necessary. The water may be either hot or cold and is preferably under high pressure. Moreover, the water should contain additives such as various soaps, insecticides/fungicides.

A control program may also be utilized to ensure execution of the usual cleaning sequences and cleaning cycles. For this purpose, conventional controllers and machine programs may be utilized.

Figure 4:
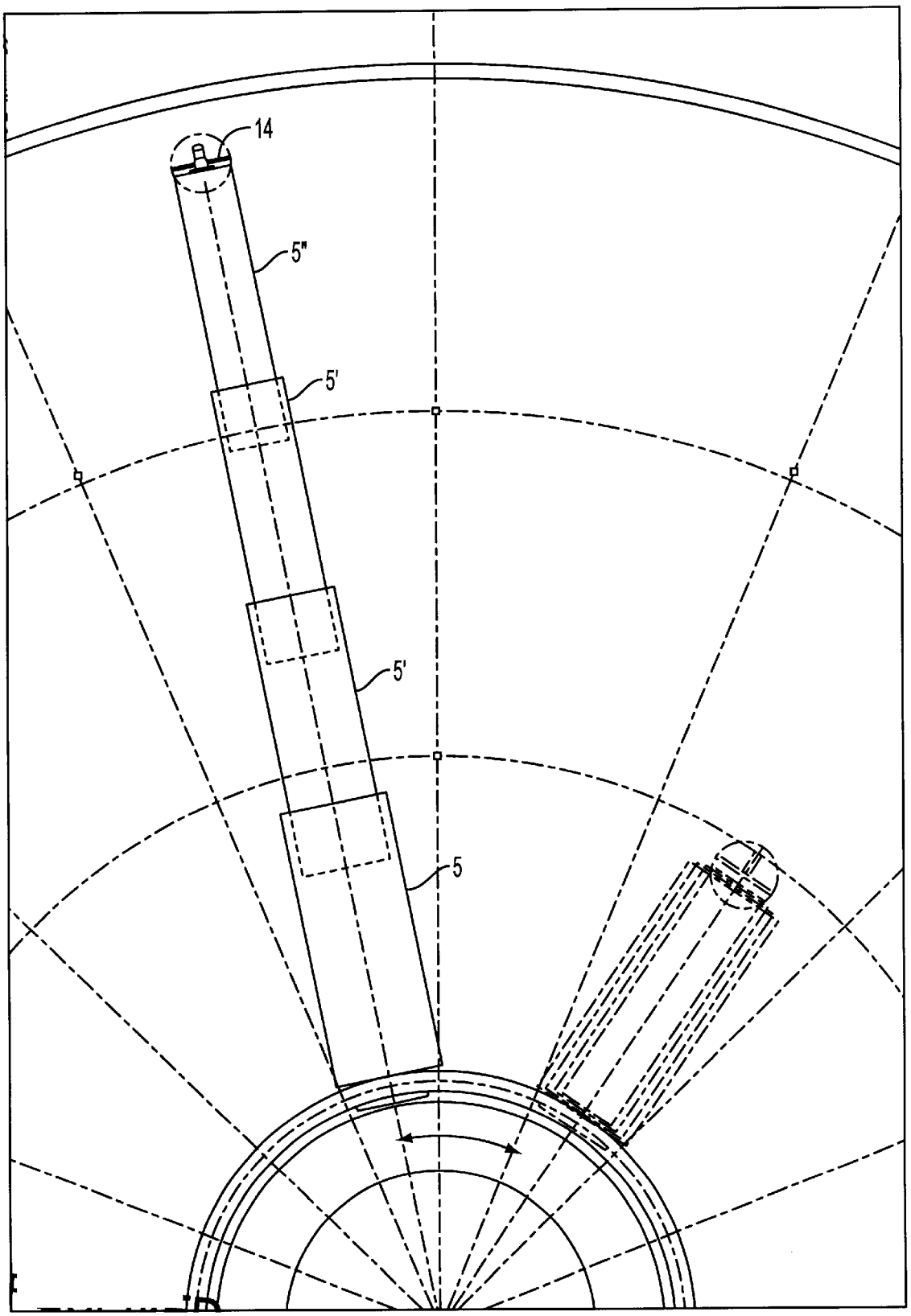
FIG. 4 is a detailed partial view of a telescoping apparatus embodiment utilized in a cylindrical tray (extended position).

In operation, the device is used to clean the germination trays. A control program may first be initiated. Then, the device begins its operation. In one embodiment, the device telescopes from the resting retracted state to an extended state. The spraying can begin to take place while the carriers are extending or after they reach the extended state. Thereafter, the device moves parallel to the side walls while the spraying cleans the trays. Finally, the carriers are retracted. In another embodiment, the carriers extend and retract while the spraying is continuously performed. Then, the device is moved parallel to the side walls and extended and retracted again. This, may be repeated for the entire length until the cleaning is completed. Alternatively, the parallel movement and the extending and retracting telescoping movements may be combined in various ways to optimize the cleaning method. Such, flexibility is easily achieved with a control program. The embodiment shown in FIG. 4 is particularly suited for use in cylindrical trays. Accordingly, carriers 5, 5', 5" can move telescopically as described above. Furthermore, carriers 5, 5' 5" can move in a circular manner to clean all the desired surfaces of a cylindrical tray.

The carriage device is normally located in the germination tray. Moreover, the material is germinated in batches. Thus, when the material is removed from the tray, the device may be operated. Of course, when the device is not being operated, it is preferably in a retracted state.

It is noted that the foregoing examples have been provided merely for the purpose of explanation and are in no way to be construed as limiting of the present invention.

While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

ABBREVIATIONS 1 germination tray
2 bottom
3 side wall
4 perforated sheet tray bottom
5 telescoping carrier
5' telescoping carrier
5" telescoping carrier
6 carrying roller
7 carrying roller
8 support
9 guide rail
10 guide roller
11 guide profile
12 supply line
13 cleaning unit
14 nozzle
15 nozzle
16 nozzle strip
17 nozzle strip
18 nozzle
19 motor

What is claimed is:

1. A device for cleaning germination trays comprising:
   a moveable carriage comprising at least one telescoping carrier, the at least one telescoping carrier being coupled to at least one supply line; and
   a cleaning unit coupled to the at least one telescoping carrier, wherein the movable carriage is arranged within a germination tray.

2. The device of claim 1, wherein the moveable carriage is moveable in a direction transverse to a telescoping direction of the at least one telescoping carrier.

3. The device of claim 1, further comprising:
   a power unit coupled to the at least one telescoping carrier;
   a water unit coupled to the telescoping carrier,
   wherein supply lines are coupled to the water unit and the power unit.

4. The device of claim 1, wherein the at least one carrier comprises a plurality of telescoping carriers.

5. The device of claim 4, wherein the plurality of telescoping carriers are telescopically mounted together.

6. The device of claim 1, wherein the device directs a cleaning fluid to a portion of the germination tray, the cleaning fluid comprising water.

7. The device of claim 6, wherein the cleaning fluid comprises water and at least one additive.

8. The device of claim 1, wherein the cleaning unit comprises at least one of at least one nozzle and at least one nozzle strip.

9. The device of claim 1, wherein the cleaning unit is mounted on an outermost part of the at least one telescoping carrier.

10. The device of claim 1, further comprising a controller for controlling the movement of the moveable carriage.

11. The device of claim 10, wherein the controller controls a telescopic movement of the at least one telescoping carrier.

12. The device of claim 10, further comprising a control program for controlling the movements of one of the moveable carriage and the at least one telescoping carrier.

13. The device of claim 1, wherein the moveable carriage comprises a control motor for moving the moveable carriage.

14. A device for cleaning germination trays comprising:
   a moveable carriage comprising at least one telescoping carrier, the at least one telescoping carrier being coupled to at least one supply line; and
   a cleaning unit coupled to the at least one telescoping carrier,
   wherein the device is positioned in the germinating tray such that the moveable carriage is moveable parallel to a side wall of the germinating tray.

15. A device for cleaning germination trays comprising:
   a moveable carriage comprising at least one telescoping carrier, the at least one telescoping carrier being coupled to at least one supply line; and
   a cleaning unit coupled to the at least one telescoping carrier,
   wherein the at least one telescoping carrier is rotatable relative to a side wall of the germination tray.

16. A device for cleaning germination trays comprising:
   a moveable carriage comprising at least one telescoping carrier, the at least one telescoping carrier being coupled to at least one supply line; and
   a cleaning unit coupled to the at least one telescoping carrier,
   wherein the at least one telescoping carrier is pivotal relative to a side wall of the germination tray.

17. A device for cleaning germination trays comprising:
   a moveable carriage comprising at least one telescoping carrier, the at least one telescoping carrier being coupled to at least one supply line;
   a cleaning unit coupled to the at least one telescoping carrier; and
   at least one additional cleaning unit coupled to the at least one telescoping carrier.

18. The device of claim 17, wherein the at least one additional cleaning unit is directed to clean at least one of a bottom of the germination tray and a side of the germination tray.

19. The device of claim 17, wherein the at least one additional cleaning unit comprises one of at least one nozzle and at least one nozzle strip.

20. A device for cleaning germination trays comprising:
   a moveable carriage comprising at least one telescoping carrier, the at least one telescoping carrier being coupled to at least one supply line; and
   a cleaning unit coupled to the at least one telescoping carrier,
   wherein the moveable carriage is mounted to a side wall via at least one guide roll which is supported on at least one guide.

21. A device for cleaning germination trays comprising:
   a moveable carriage comprising at least one telescoping carrier, the at least one telescoping carrier being coupled to at least one supply line; and a cleaning unit coupled to the at least one telescoping carrier, wherein the moveable carriage comprises a control motor for moving the moveable carriage, and wherein the moveable carriage is fed with cleaning fluid and power from a connection disposed on at least one side wall of the germination tray.

22. A device for cleaning germination trays comprising:

a moveable carriage comprising a plurality of telescoping carriers;

at least one of the plurality of carriers having at least one cleaning unit and accommodating at least one supply line which carries a cleaning fluid;

wherein each of the plurality of carriers is telescopically moveable with respect to the moveable carriage, and wherein the movable carriage is arranged within a germination tray.

* * * * *